(12) United States Patent
Barth et al.

(10) Patent No.: US 9,193,473 B2
(45) Date of Patent: Nov. 24, 2015

(54) ANGLE OF ATTACK DISPLAY

(71) Applicant: Safe Flight Instrument Corporation, White Plains, NY (US)

(72) Inventors: Arthur C. Barth, White Plains, NY (US); Randall A. Greene, Greenwich, CT (US); Louis Simons, Mamaroneck, NY (US); Darren Taillie, White Plains, NY (US)

(73) Assignee: SAFE FLIGHT INSTRUMENT CORPORATION, White Plains, NY (US)

( * ) Notice: Subject to any disclaimer, the term of this patent is extended or adjusted under 35 U.S.C. 154(b) by 29 days.

(21) Appl. No.: 14/032,840

(22) Filed: Sep. 20, 2013

(65) Prior Publication Data

US 2015/0084792 A1   Mar. 26, 2015

(51) Int. Cl.
G08B 23/00   (2006.01)
B64D 43/02   (2006.01)
G01D 1/00    (2006.01)

(52) U.S. Cl.
CPC . *B64D 43/02* (2013.01); *G01D 1/00* (2013.01)

(58) Field of Classification Search
CPC ...... B64D 43/02; B64C 13/16; G01C 23/005; G01P 13/025; G05D 1/0607; G01D 1/00
USPC ........... 340/963–970, 974–976, 691.1, 691.6, 340/815.4; 701/4–14; 434/49, 51
See application file for complete search history.

(56) References Cited

U.S. PATENT DOCUMENTS

| | | | |
|---|---|---|---|
| 6,131,055 A * | 10/2000 | Patrick | 701/6 |
| 6,982,655 B2 * | 1/2006 | Vialleton et al. | 340/969 |
| 7,286,911 B2 | 10/2007 | Kane | |
| 8,135,502 B2 * | 3/2012 | Deleris et al. | 701/14 |
| 8,290,641 B2 | 10/2012 | Marstall et al. | |
| 2011/0172855 A1 * | 7/2011 | Marstall et al. | 701/9 |
| 2013/0096738 A1 * | 4/2013 | Yamasaki | 701/14 |
| 2014/0266808 A1 * | 9/2014 | Hedrick et al. | 340/974 |

\* cited by examiner

*Primary Examiner* — Thomas Mullen
(74) *Attorney, Agent, or Firm* — Morrison & Foerster LLP

(57) ABSTRACT

An aircraft safety system includes a Stall/Spin Warning & Recovery Computer, an angle of attack sensor, a side slip sensor and an angle of attack display. The Stall/Spin Warning and Recovery Computer detects whether the aircraft is in a safe condition or an unsafe condition. The angle of attack display includes a first configuration that displays information indicative of safe aircraft condition when the orientation detector detects a safe condition and a second configuration that displays information indicative of unsafe aircraft condition when the computer detects an unsafe condition. The display may transition from the first configuration to the second configuration when the orientation detector detects an unsafe condition and then to a third configuration, which may include visual control-input instructions that enable recovery to a safe condition.

22 Claims, 4 Drawing Sheets

ANGLE OF ATTACK DISPLAY

FIELD OF THE DISCLOSURE

This disclosure generally relates to systems and methods for flying an aircraft. More particularly, this disclosure relates to systems and methods for providing control-input instructions to a pilot of an aircraft when the aircraft is in an unsafe condition, e.g., excessive angle of attack and/or excessive angle of attack with excessive angle of side slip.

BACKGROUND

A large percentage of aviation accidents result from loss of control due to an aircraft stall. A stall occurs when an aircraft experiences a sudden decrease in lift because the aircraft's "angle of attack" exceeds a critical angle. The aircraft may depart controlled flight, lose altitude, and may crash if there is insufficient altitude to recover.

A spin may develop when the aircraft is in a stalled condition. A spin occurs when an aircraft is stalling, but there is also excessive side slip which causes one wing to stall more deeply than the other, thereby creating more drag on one side of the aircraft and creating a rotation about the longitudinal axis of the aircraft.

Stalls and spins can be avoided by flying an aircraft below its critical angle of attack. To help pilots avoid stall conditions, some aircraft include an Angle of Attack ("AoA") display or indicator. These displays inform the pilot of their current angle of attack relative to the critical angle, thus providing the pilot awareness of available angle of attack and allowing the pilot proactive control over stall prevention.

In commercial aircraft (so called "Part 25" aircraft), advanced technical solutions may provide automated flight controls designed to prevent stall conditions. For cost and weight reasons, smaller aircraft (so called "Part 23" aircraft) may have less advanced safety measures. The majority of aviation accidents involve smaller aircraft.

Traditionally, pilots of smaller aircraft avoid stalling by monitoring an airspeed indicator. In most cases, audible and/or visual alarms alert pilots to an impending stall. For example, an audible alarm may sound when an aircraft's angle of attack approaches the critical angle. However there usually isn't an AoA indicator to provide rate and trend information prior to the pilot receiving the warning.

While the airspeed indicator is the primary means of avoiding a stall, the airspeed at which the aircraft stalls changes with the aircraft's weight and load factor. Angle of attack is independent of aircraft weight or load factor.

The traditional safety measures to avoid a stall or stall/spin, however, have limited efficacy. For example, a pilot relying on traditional safety measures must quickly ascertain the necessary corrective control-inputs and execute those maneuvers in time to avoid a stall. Unfortunately, traditional solutions fail when a pilot is unable to correctly ascertain the necessary corrective control-inputs due to the pilot's inexperience, stress, or disorientation.

SUMMARY

This disclosure relates to systems and methods for providing a pilot with control input instructions when an aircraft is in an unsafe condition. Advantageously, the systems and methods may provide the pilot with control-input instructions for avoiding or recovering from a stall or a spin. The instructions may be displayed on the aircraft's AoA display.

In one embodiment, an aircraft angle of attack display includes a first configuration that displays information indicative of safe aircraft condition and a second configuration that displays information indicative of unsafe aircraft condition, wherein the display transitions from the first configuration to the second configuration when an unsafe aircraft condition is detected. If the unsafe condition further deteriorates, then the display transitions to a third configuration. The third configuration provides visual control-input instructions to a pilot of the aircraft. By including the control-input instructions on the AoA display, no additional space needs to be consumed on a flight display. Also, because the AoA display may be the first indicator a pilot inspects after receiving a warning, placing instructions on the AoA display may allow the pilot to quickly receive the corrective control-input instructions.

In another embodiment, the control-input instructions may comprise elevator manipulation instructions (e.g., push the yoke forward to reduce the AoA) and rudder manipulation instructions (e.g., to correct excessive side slip) that enable the aircraft to return to a safe condition. In some embodiments, the unsafe condition may comprise at least one of an impending stall, an impending spin, an actual stall, and an actual spin. In some embodiments, the first configuration may display information indicative of the aircraft's potential for stalling or spinning.

In one embodiment, the second or third configuration may be replaced by the first configuration when a safe condition is detected. In another embodiment, the third configuration may be altered as correct control-inputs are performed.

In some embodiments, the angle of attack display may be integrated into a primary flight display, a heads-up display, a standby attitude and heading indicator, or an integrated standby display unit.

In one embodiment, an aircraft safety system includes a slip/skid indicator for displaying side slip, an angle of attack sensor and an angle of attack display. The slip/skid indicator detects whether the aircraft is in a safe condition (no side slip) or an unsafe condition (excessive side slip). The angle of attack sensor likewise detects if the aircraft is in a safe or unsafe condition. The angle of attack display includes a first configuration that displays information indicative of a safe aircraft condition and when the slip/skid indicator and/or AoA Sensor detects the safe condition and a second configuration that displays information indicative of unsafe aircraft condition when the AoA Sensor detects an unsafe condition. The display may transition from the first configuration to the second configuration when the AoA Sensor detects an unsafe condition (e.g., normalized AoA>0.8). The second configuration may transition to a third configuration to include visual control-input instructions that enable recovery to a safe condition. By including the control-input instructions on the AoA display, no additional space needs to be consumed on a flight display. Also, because the AoA display may be the first indicator a pilot inspects after receiving a warning, placing instructions on the AoA display may allow the pilot to quickly receive the corrective control-input instructions.

In another embodiment, only configurations one and two are present. The display may transition from the first configuration to the second configuration when the AoA Sensor detects an unsafe condition (normalized AoA>0.8).

In some embodiments, the second or third configuration may be replaced by the first configuration when a safe condition is detected.

In some embodiments, the angle of attack display may be integrated into a primary flight display, a heads-up display, a standby attitude and heading indicator, or an integrated standby display unit.

In one embodiment, a method for providing visual control-input instructions to a pilot of an aircraft includes detecting whether the aircraft is in a safe condition or an unsafe condition, displaying a first configuration on an angle of attack display when the safe condition is detected, and transitioning the angle of attack display to a second configuration when the unsafe condition is detected. A third configuration may provide the visual control-input instructions that enable recovery of the aircraft to a safe condition when the unsafe condition deteriorates. By including the control-input instructions on the AoA display, no additional space needs to be consumed on a flight display. Also, because the AoA display may be the first indicator a pilot inspects after receiving a warning, placing instructions on the AoA display may allow the pilot to quickly receive the corrective control-input instructions.

In another embodiment, the control-input instructions may comprise elevator and rudder manipulation instructions that enable the aircraft to return to a safe condition. In some embodiments, the unsafe condition may comprise at least one of an impending stall, an impending spin, an actual stall, and an actual spin. In some embodiments, the first configuration may provide an indication of the aircraft's potential for stalling or spinning.

In one embodiment, the third configuration may be replaced when the safe condition is detected. In another embodiment, the third configuration may be altered as correct control-inputs are performed.

In some embodiments, the angle of attack display may be integrated into a primary flight display, a heads-up display, a standby attitude and heading indicator, or an integrated standby display unit.

In one embodiment, a method for providing visual control-input instructions to a pilot of an aircraft may include detecting whether the aircraft is in a safe condition or an unsafe condition, displaying a first configuration on an angle of attack display when the safe condition is detected, transitioning the angle of attack display to a second configuration when an unsafe condition is detected, and further transitioning to a third configuration if the unsafe condition deteriorates. The third configuration may provide the visual control-input instructions that enable recovery of the aircraft to a safe condition. By including the control-input instructions on the AoA display, no additional space needs to be consumed on a flight display. Also, because the AoA display may be the first indicator a pilot inspects after receiving a warning, placing instructions on the AoA display may allow the pilot to quickly receive the corrective control-input instructions.

In another embodiment, the control-input instructions may comprise elevator and rudder manipulation instructions that enable the aircraft to return to a safe condition. In some embodiments, the unsafe condition may comprise at least one of an impending stall, an impending spin, an actual stall, and an actual spin. In some embodiments, the first configuration may provide an indication of the aircraft's potential for stalling or spinning.

In one embodiment, the second or third configurations may be replaced when the safe orientation is detected. In another embodiment, the third configuration may be altered as correct control-inputs are received.

In some embodiments, the angle of attack display may be integrated into a primary flight display, a heads-up display, a standby attitude and heading indicator, or an integrated standby display unit.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

To improve the safety of aircraft, the present disclosure describes systems and methods for providing control-input instructions to a pilot of an aircraft when the aircraft is in an unsafe condition. The systems and methods include an AoA display which transitions from a first configuration during a safe condition to a second configuration alerting the pilot of the unsafe condition and, if the unsafe condition deteriorates further, the display transitions to a third configuration depicting recovery instructions during an unsafe condition. By including the control-input (recovery) instructions on the AoA display, no additional space need be consumed on a flight display. Also, because the AoA display may be the first indicator a pilot inspects after receiving a warning, including instructions on the AoA display may allow the pilot to quickly receive the corrective instructions. These benefits may be useful for both small and large aircraft.

A typical AoA display provides a pilot with a graphical representation of an aircraft's potential for a stall. In some AoA displays, the angle may be "normalized" relative to the critical angle, so that a normalized angle under 1.0 indicates the aircraft's angle of attack is below the critical angle. Some systems may include audible and visual alarms that alert a pilot to an unsafe angle of attack.

Some displays include additional information on related "stall speed." The slower an airplane travels, the more angle of attack is needed to produce sufficient lift for stable flight. At the stall speed, the angle needed to produce this lift exceeds the critical angle.

Figure 1:
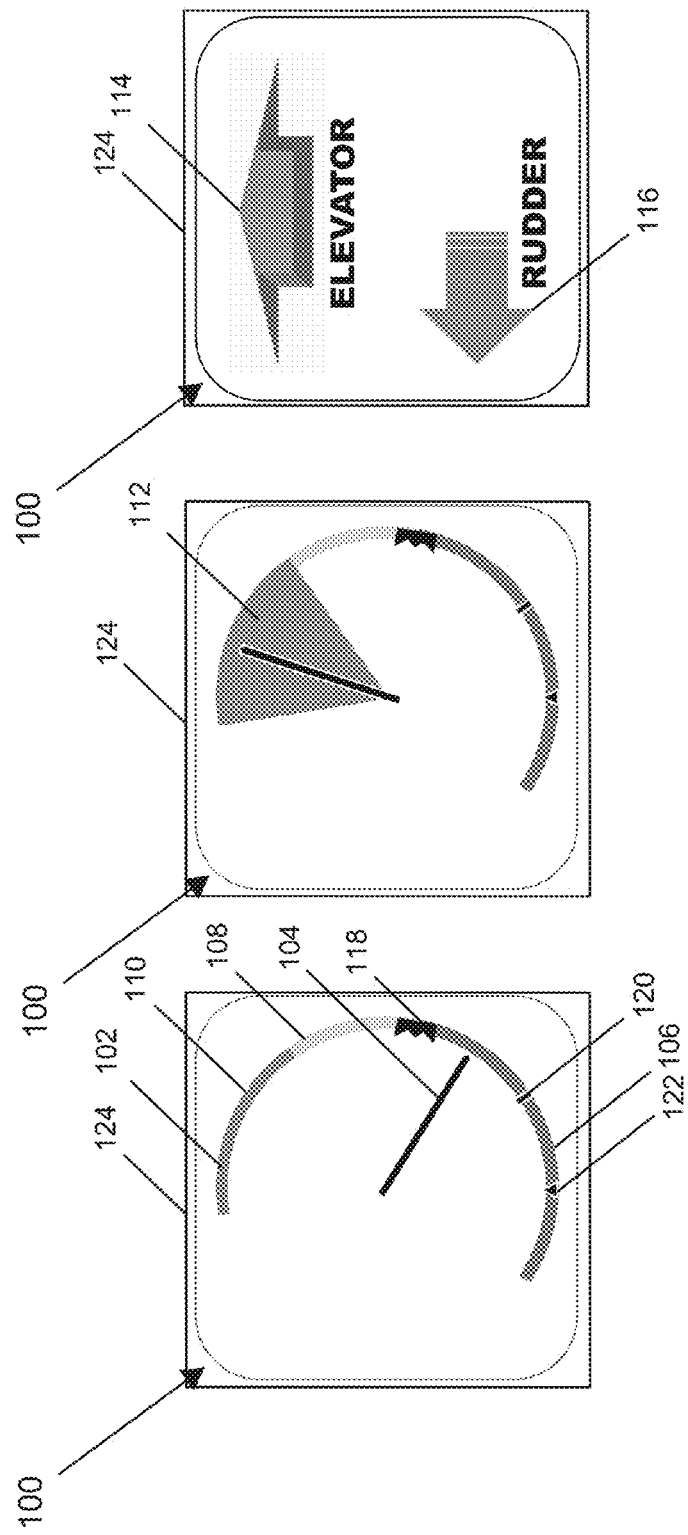
FIG. 1A depicts an example of an AoA display, in accordance with one embodiment.
FIG. 1B depicts the AoA Warning display as a safe AOA has been exceeded and a critical AoA is approached.
FIG. 1C depicts the AoA display in the recovery configuration.

FIGS. 1A, 1B, and 1C depict an example of an AoA display, in accordance with one embodiment. AoA display 100 includes a scale 102, and a needle 104 to identify a position on the scale 102. A position on the scale 102 may represent a normalized angle of attack of the airplane. The scale is divided into three color-coded sections 106, 108, and 110 for indicating the aircraft's margin from stall.

FIG. 1A depicts AoA display 100 when an aircraft is in a safe condition, as indicated by the needle 104 lying in the first section 106. The relative sizes of sections 106, 108, and 110 may be determined as a function of the normalized angle of attack (normalized relative to the critical angle) or normalized speed of the aircraft (normalized relative to the stall speed.) An example of a safe condition (first section 106) may be a normalized aircraft angle of attack at or below 0.6 Normalized Angle of Attack ("NorAoA") or an aircraft speed at or above 1.3 stall speed ("$V_s$"). An example of a normalized aircraft angle of attack for second section 108 may be 0.6-0.8 NorAoA and an example of an aircraft speed for second section 108 may be 1.3 to 1.1 $V_s$. An example of an aircraft angle of attack for third section 110 may be above 0.8 NorAoA and an example of an aircraft speed for third section 110 may be less than 1.1 $V_s$. Some embodiments may use different ranges or different flight parameters for determining ranges, without deviating from the scope of the claimed subject matter.

Activation of the second configuration is shown in FIG. 1B which depicts AoA display 100 when an aircraft is in a potentially problematic angle of attack, as indicated by the needle 104 lying in the third section 110. In FIG. 1B, the aircraft is facing an impending stall and the AoA display is alerting the pilot to the condition. To further draw the pilot's attention to the potential problem, the third portion of AoA display 100 may be illuminated as a wedge 112, which may flash for additional prominence. An audible alarm may further draw the attention of the pilot; for example, a voice may announce "Stall-Stall." The audible alarm may be activated when the aircraft speed reaches the third section, or when the stall-speed reaches a predetermined speed within the third section, such as 1.1 $V_s$. In other embodiments, other flight parameters may be used to determine the audible alarm activation.

FIG. 1C depicts AoA display 100 where the unsafe condition of FIG. 1B has further deteriorated. The display configuration shown in FIGS. 1A and 1B has been changed to a third display configuration providing control-input instructions for the pilot to return the aircraft to a safe condition. The exemplary instructions shown in FIG. 1C include an elevator manipulation 114 and a rudder manipulation 116. The instructions 114 and 116 assist the pilot with returning the aircraft to a safe condition. Stall-related accidents involving pilot inexperience, stress, or disorientation can thus be reduced by assisting the pilot to make accurate and quick decisions when the aircraft is in an unsafe condition. In addition, by utilizing the AoA display—which is where a pilot's attention may be drawn in the event of a warning—the pilot may receive instructions quickly, thereby providing more time (and, by extension, more altitude) to execute corrective control-inputs.

Further, this may be a cost-effective solution for smaller aircraft. Smaller aircraft may not have the space in a flight display for additional indicators/gauges, nor, in general, do smaller aircraft have the weight and cost headroom to accommodate additional indicators/gauges. It will be readily understood by those of ordinary skill in the art that the systems and methods described herein could also be used in larger aircraft.

Activation of the third configuration may be determined as a function of the normalized angle of attack (normalized relative to the critical angle) or normalized speed of the aircraft (normalized relative to the stall speed).

In some embodiments, the control-input instructions may be altered—for example, diminishing size or intensity of graphical instructions—as the pilot correctly executes the provided instructions. This may reassure the pilot that the unsafe situation is being addressed, lower his stress levels, and encourage continued implementation of the provided control-input instructions. In some embodiments, the control-input instructions may disappear once a safe condition is detected.

In some embodiments, the control-input instructions may be accompanied by audible alarms. For example, an alarm may state "Recover-Recover" or may include specific directions corresponding to the control-input instructions.

In some embodiments, an AoA display may include other features for the pilot's reference. For example, the AoA display may include the reference landing approach speed, the maximum lift to drag ratio, and the best cruise speed (Carson's speed). These are indicated in FIG. 1A as 118, 120, and 122, respectively. The control-input instructions may be any text or graphic that replaces the first, safe-orientation configuration. The control-input instructions may include written instructions, symbolic images of controls being activated, realistic images of controls being activated, or moving images of the control being activated. Other control text and graphics may also be included.

In some embodiments, the first and second configurations may be considered as variations of one display configuration providing an AoA or side-clip indication, with the third configuration being another display-type providing control-input instructions.

In some embodiments, AoA display 100 is integrated into aircraft component 124. In some embodiments, aircraft component 124 includes a primary flight display, a heads-up display, a standby attitude and heading indicator, or an integrated standby display unit.

Figure 2:
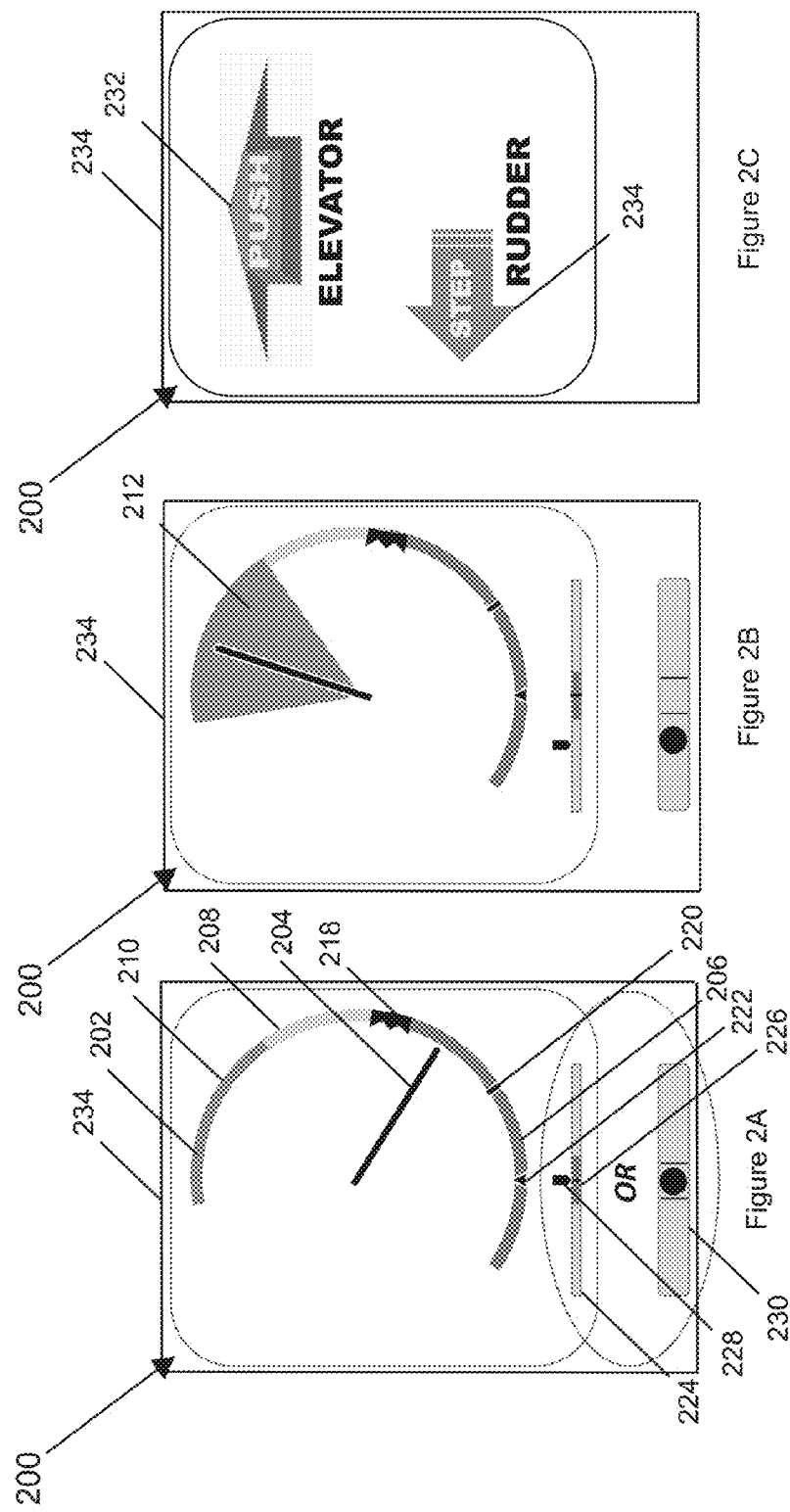
FIG. 2A depicts an example of an AoA display with the incorporation of a slip/skid indicator, in accordance with one embodiment.
FIG. 2B depicts the AoA display of FIG. 1B with a side slip (ball not centered).
FIG. 2C depicts the AoA display of FIG. 1C in a different recovery configuration.

FIGS. 2A, 2B, and 2C depict an example of an AoA display in accordance with one embodiment. AoA display 200 contains some similar elements described above with reference to AoA display 100 in FIGS. 1A-1C, and such elements are not re-described with respect to FIGS. 2A-2C. AoA display 200 includes a side-slip indicator 218 and control-input instructions 232 and 234.

Slip/Skid (Side-slip) indicator 224 provides an indication of the aircraft's potential for a spin. A spin occurs when an aircraft stalls, but one wing stalls more deeply than the other wing. This may occur when the aircraft is moving sideways as well as forwards relative to the incident airflow, that is, when the aircraft is in a side-slip.

Slip/Skid (Side-slip) indicator 224 includes a safe range 226 and a needle 228 to indicate whether the aircraft is in a condition that correlates to the safe range 226. An alternative (slip indicator 230) to slip indicator 224 is also provided. Other side-slip indicators may also be used, without deviating from the scope of the claimed subject matter.

In some embodiments, slip/skid (side-slip) indicator may include a lateral accelerometer and/or a tilt sensor, or any suitable device.

In a similar manner to AoA display 100, AoA display 200 transitions from a first configuration (associated with a safe aircraft condition) to a second configuration which alerts the pilot that he or she may have exceeded a safe AoA and the aircraft is in a side slip and then a third configuration (associated with a unsafe aircraft condition) that provides control-input instructions 232 and 234 for recovering the aircraft.

Control-input instructions 232 and 234 provide additional information, compared to control-input instructions 114 and 116 of FIG. 1C. Specifically, control-input instructions 232 and 234 explicitly include physical manipulations implicit in control-input instructions 114 and 116 (namely, "push" the elevator and "step" on the rudder).

In some embodiments, AoA display 200 is integrated into aircraft component 234. In some embodiments, aircraft component 234 includes a primary flight display, a heads-up display, a standby attitude and heading indicator, or an integrated standby display unit.

Figure 3:
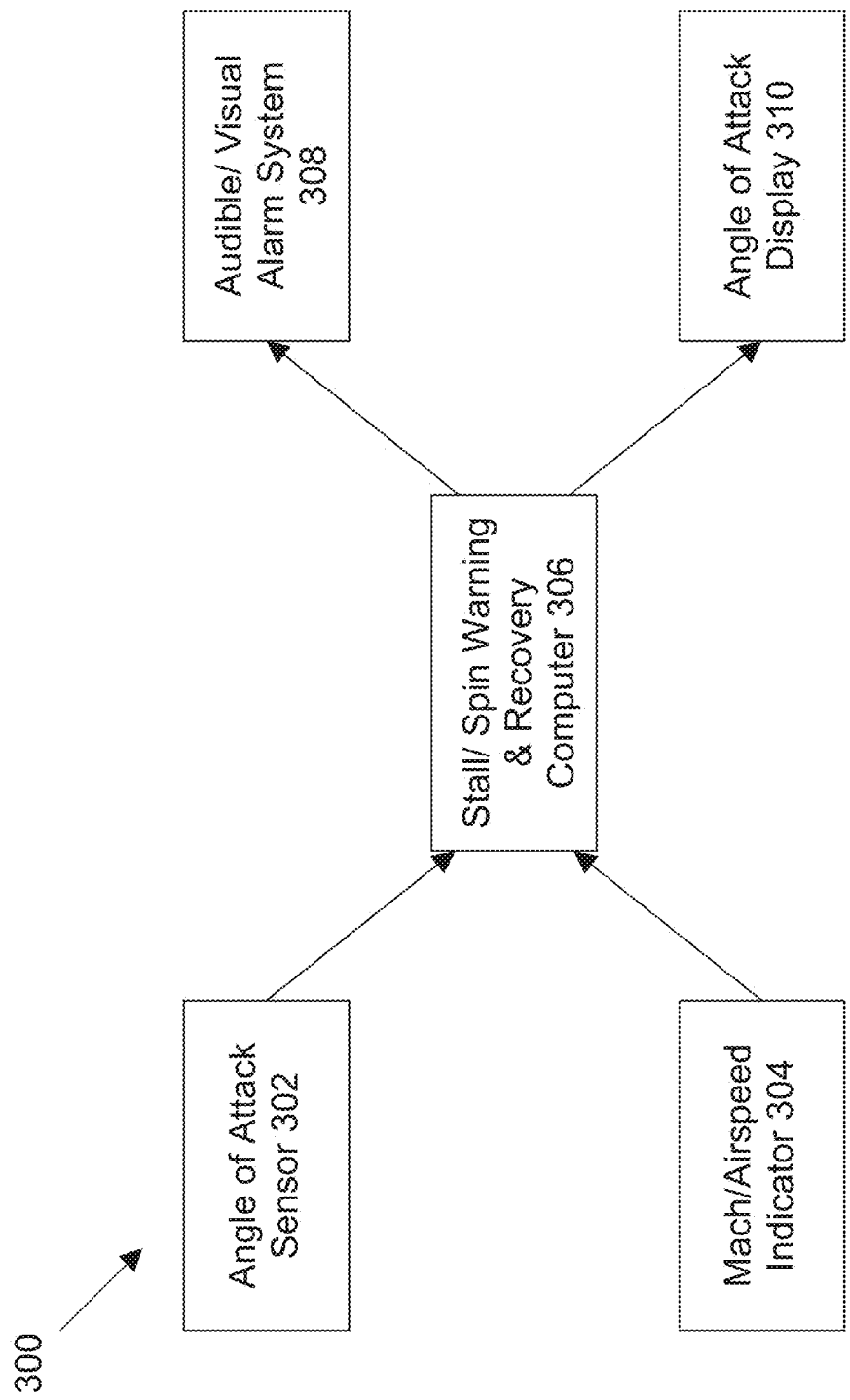
FIG. 3 depicts an example of an aircraft safety system, in accordance with one embodiment.

FIG. 3 depicts an example of an aircraft safety system, in accordance with one embodiment. Aircraft safety system 300 includes an angle of attack sensor 302, a Mach/airspeed indicator 304, a stall/spin warning and recovery computer 306, an audible/visual alarm 308, and an angle of attack display 310.

Angle of attack sensor 302 may determine the aircraft's orientation to oncoming airflow. The angle of attack may be determined using AoA Sensors such as Safe Flight Instrument Corporation's Swept Vane AoA Sensor, Paddle Vane AoA Sensor, Integrated AoA Sensor or Lift Transducer. AoA Sensors are also produced by UTC, ASI, Thales and others. AoA can also be determined by any other mechanism for measuring angle of attack, such as differential pressure.

Mach/Calibrated Airspeed sensor 304 may determine the aircraft's speed relative to the oncoming airflow. The speed may be determined using a pitot tube (such as probes built by UTC, Thales and Harco) or any other mechanism for measuring airspeed.

The angle of attack sensor 302, a Side Slip Sensor (not shown) and Mach/calibrated airspeed sensor 304 provide data to the Stall/Spin Warning & Recovery Computer 306. Note, in some embodiments, the Stall/Spin Warning & Recovery Computer 306 may receive inputs from one of the angle of attack sensor 302 and one Side slip sensor (not shown). The Stall/Spin Warning & Recovery Computer 306 determines if the aircraft is in a safe or unsafe condition, and feeds data to the audible/visual alarm 308 and angle of attack display 310.

As with angle of attack display 100 and 200, angle of attack display 310 transitions from a first configuration when the Stall/Spin Warning & Recovery Computer detects a safe condition to a second configuration when the Stall/Spin Warning & Recovery Computer detects an unsafe condition. Angle of attack display 310 may include any mechanism for displaying the angle of attack, such as Safe Flight's AoA Display. AoA displays are produced by UTC, Thales and others. The third configuration may provide control-input instructions for a recovery to a safe condition. Audible/visual alarm 308 may provide additional warnings to the pilot. Such warnings may include flashing lights, horns or other audible alarms, or a voice announcing the unsafe condition.

The Stall/Spin Warning & Recovery Computer 306 may also include inputs from other aircraft systems such as the flap system and landing gear (not shown). In some embodiments, this data may be provided to the angle of attack display 304 and displayed for the pilot. The side slip detector could include any mechanism for detecting side-slip, including simple inclinometers.

A processor or other circuitry may be included in the Stall/Spin Warning & Recovery Computer 306 to process all data received. Such processors may include one or more of the modules in Safe Flight's Dual Digital Stall Warning and Protection Computer, other similar computers from UTC and ASI, or any suitable device.

In some embodiments, the control-input instructions displayed on angle of attack display 310 may include elevator and rudder manipulations for returning the aircraft to a safe condition. In some embodiments, the unsafe condition may be an impending stall, an impending spin, an actual stall, or an actual spin.

In some embodiments, system 300 may replace the second or third configuration when a safe condition is detected. In some embodiments, system 300 may alter the second or third configuration as the correct control-inputs are performed.

In some embodiments, the first configuration displayed by system 300 may provide an indication of the aircraft's potential for stalling or spinning. In some embodiments, angle of attack display 310 may be integrated into a primary flight display, a heads-up display, a standby attitude and heading indicator, or an integrated standby display unit.

Figure 4:
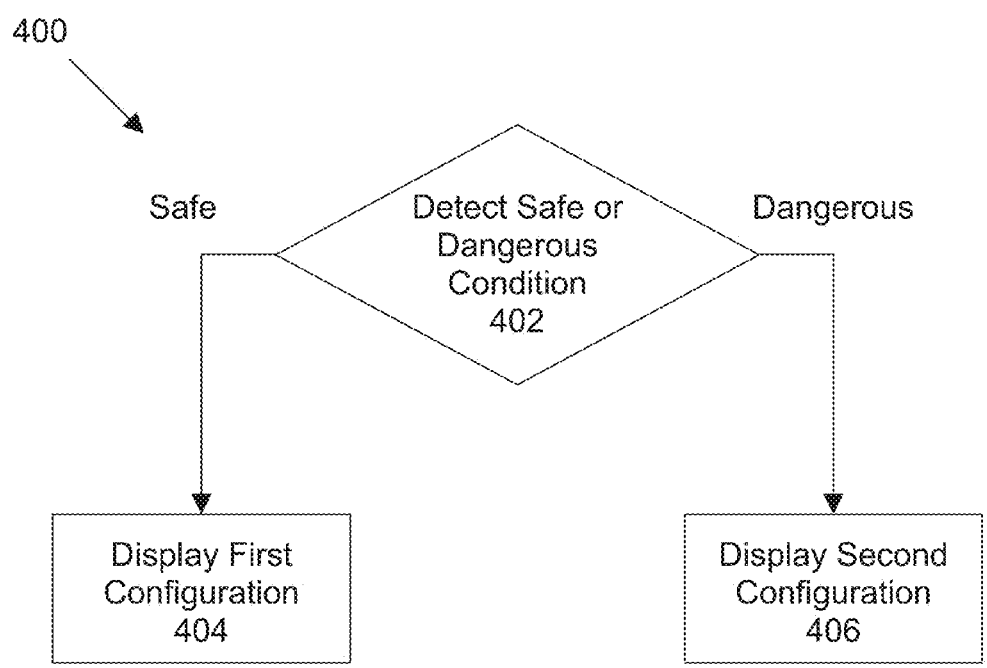
FIG. 4 depicts an example of a method for providing control-input instructions to a pilot of an aircraft, in accordance with one embodiment.

FIG. 4 depicts an example of a method for providing control-input instructions to a pilot of an aircraft, in accordance with one embodiment. Method 400 includes detecting whether the aircraft is in a safe condition or an unsafe condition 402, displaying a first configuration on an angle of attack display when a safe condition is detected 404, and transitioning the angle of attack display to a second configuration when an unsafe condition is detected 406. If the unsafe condition continues to deteriorate to the point of a stall warning, then (simultaneous with the stall warning) the display transitions to a third configuration which provides the control-input instructions for a recovery to the safe condition. Once the safe configuration returns, the display may transition to the first configuration.

In some embodiments, the control-input instructions include elevator and rudder manipulations for returning the aircraft to the safe condition. In some embodiments, the unsafe condition may be an impending stall, an impending spin, an actual stall, or an actual spin.

In some embodiments, method 400 includes replacing the second configuration when the safe condition is detected. In some embodiments, method 400 includes altering the third configuration as the correct control-inputs are performed.

In some embodiments, the first configuration provides an indication of the aircraft's potential for stalling or spinning. In some embodiments, the angle of attack display may be integrated into a primary flight display, a heads-up display, a standby attitude and heading indicator, or an integrated standby display unit.

As described above, the control-input instructions may include elevator and rudder manipulations. In some embodiments, the control-input may include throttle manipulations.

The third configuration may be any display that includes control-input instructions for flying an airplane. In some embodiments, the third configuration completely replaces the first and second configurations on the AoA display. In other embodiments, the second configuration overlays or is otherwise presented in conjunction with the first configuration on the AoA display.

As used herein, an "unsafe condition" can be understood to refer to any undesirable aerodynamic condition of an aircraft. Some examples of an unsafe aircraft condition may include an aircraft in an impending stall, an impending spin, an actual stall, or an actual spin. As used herein, an "impending" stall or spin can be understood to be a flight parameter that is within a predetermined value of a parameter for an actual stall or actual spin, respectively. In some embodiments, the aircraft condition can be understood to be an aircraft orientation.

In some embodiments, an airspeed indicator may serve a similar role as the angle of attack displays described herein. For example, an airspeed indicator may be replaced with a different configuration that provides control input instructions when an aircraft is flying in an unsafe condition. The control-inputs may be similar or the same as the control inputs described herein.

In some embodiments, the angle of attack displays described herein may be a light emitting diode array, a liquid crystal display, but may also be cathode ray tubes, plasma displays, or any other display capable of transitioning from a first configuration to a second to third configuration. The displays may be independent of an aircraft and integrated during an aircraft retrofit. The displays may be built into the aircraft during the aircraft's manufacture. The displays may be integrated in a primary flight display, in a heads-up display, a standby attitude and heading indicator, or an integrated standby display unit, or other aircraft display.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aircraft angle of attack display, comprising:
   a first content configuration, comprising a representation of a first angle of attack, that displays information indicative of a safe aircraft condition,
   a second content configuration, comprising a representation of a second angle of attack, that displays information indicative of an unsafe aircraft condition, and
   a third content configuration, comprising visual control-input instructions that replace the representation of the second angle of attack when one or more detected conditions indicate the aircraft has failed to return to a safe aircraft condition.

2. The display of claim 1, wherein the control-input instructions comprise elevator and rudder manipulation instructions that enable a pilot to return the aircraft to a safe condition.

3. The display of claim 1, wherein the unsafe condition comprises at least one of an impending stall, an impending spin, an actual stall, and an actual spin.

4. The display of claim 1, wherein the second configuration is replaced with the first content configuration when a safe condition is detected.

5. The display of claim 1, wherein the third configuration is replaced with the first content configuration when a safe condition is detected.

6. The display of claim 1, wherein the third configuration is altered as correct control-inputs are performed.

7. The display of claim 1, wherein the first and second configurations display information indicative of the aircraft's potential for stalling or spinning.

8. The display of claim 1, wherein the angle of attack display is integrated into a primary flight display, a heads-up display, a standby attitude and heading indicator, or an integrated standby display unit.

9. An aircraft safety system comprising:
   a Stall/Spin Warning and Recovery Computer that detects whether the aircraft is in a safe condition or an unsafe condition, and
   an angle of attack display comprising
   a first content configuration, comprising a representation of a first angle of attack, that displays information indicative of a safe condition when the Stall/Spin Warning and Recovery Computer detects a safe condition,
   a second content configuration, comprising a representation of a second angle of attack, that displays information indicative of an unsafe condition when the Stall/Spin Warning and Recovery Computer detects an unsafe condition, and
   a third content configuration comprising visual control-input instructions that enable recovery to a safe condition, wherein the visual control-input instructions replace the representation of the second angle of attack when there is a stall/spin warning.

10. The system of claim 9, wherein the instructions comprise elevator and rudder manipulation instructions that enable a pilot to return the aircraft to a safe condition.

11. The system of claim 9, wherein the unsafe condition comprises at least one of an impending stall, an impending spin, an actual stall, and an actual spin.

12. The system of claim 9, wherein the second content configuration is replaced with the first content configuration when a safe condition is detected.

13. The system of claim 9, wherein the third content configuration is altered as correct control-inputs are performed.

14. The system of claim 9, wherein the first content configuration displays information indicative of the aircraft's potential for stalling or spinning.

15. The system of claim 9, wherein the angle of attack display is integrated into a primary flight display, a heads-up display, a standby attitude and heading indicator, or an integrated standby display unit.

16. A method for providing control-input instructions to a pilot of an aircraft comprising:
   detecting whether the aircraft is in a safe condition or an unsafe condition,
   displaying a first content configuration, comprising a representation of a first angle of attack, on an angle of attack display when the safe condition is detected,
   replacing the angle of attack display with a second content configuration, comprising a representation of a second angle of attack, when the unsafe condition is detected, and
   replacing the representation of the second angle of attack with visual control-input instructions enabling recovery of the aircraft to a safe condition, when one or more detected conditions indicate the aircraft has failed to return to a safe aircraft condition.

17. The method of claim 16, wherein the control-input instructions comprise elevator and rudder manipulation instructions that enable a pilot to return the aircraft to a safe condition.

18. The method of claim 16, wherein the unsafe condition comprises at least one of an impending stall, an impending spin, an actual stall, and an actual spin.

19. The method of claim 16, comprising replacing a content of the second content configuration when a safe condition is detected.

20. The method of claim 16, comprising altering the visual control-input instructions as correct control-inputs are performed.

21. The method of claim 16, wherein the first content configuration provides an indication of the aircraft's potential for stalling or spinning.

22. The method of claim 16 wherein the angle of attack display is integrated into a primary flight display, a heads-up display, a standby attitude and heading indicator, or an integrated standby display unit.

* * * * *